US012743544B2

(12) United States Patent
Yang

(10) Patent No.: US 12,743,544 B2
(45) Date of Patent: Sep. 22, 2026

(54) IMPLEMENTING PASSWORD RESETTING CONTROL IN A DATABASE CONTAINING SECRET INFORMATION

(71) Applicant: Lemon Inc., Grand Cayman (KY)

(72) Inventor: Xinying Yang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 35 days.

(21) Appl. No.: 19/053,968

(22) Filed: Feb. 14, 2025

(65) Prior Publication Data

US 2026/0244780 A1 Aug. 20, 2026

(51) Int. Cl.
*G06F 21/62* (2013.01)
*G06F 21/45* (2013.01)
*G06F 21/60* (2013.01)

(52) U.S. Cl.
CPC .......... *G06F 21/6227* (2013.01); *G06F 21/45* (2013.01); *G06F 21/604* (2013.01); *G06F 21/629* (2013.01)

(58) Field of Classification Search
None
See application file for complete search history.

(56) References Cited

U.S. PATENT DOCUMENTS 9,935,940 B1 * 4/2018 DeMoss ................ H04L 63/083
12,028,346 B1 * 7/2024 Cannard ............... H04L 63/102
2006/0053112 A1 * 3/2006 Chitkara ............... G06F 16/284 707/999.009
2007/0220004 A1 * 9/2007 Fifield ................. G06F 21/6227 707/999.009
2008/0033960 A1 * 2/2008 Banks ................... H04L 9/0894 707/999.009
2010/0125579 A1 * 5/2010 Pardoe .................... G06F 16/86 707/E17.014
2010/0198728 A1 * 8/2010 Aabye .................... G06Q 20/40 726/19
2010/0306017 A1 * 12/2010 Dreyfuss ................ G06Q 10/06 709/206

(Continued)

OTHER PUBLICATIONS

Rob Dunn; How to delegate password reset permissions for your IT staff; 2010; retrieved from the Internet https://community.spiceworks.com/t/how-to-delegate-password-reset-permissions-for-your-it-staff/1005001; pp. 1-19, as printed (Year: 2010).*

(Continued)

*Primary Examiner* — Michael W Chao
(74) *Attorney, Agent, or Firm* — BakerHostetler

(57) ABSTRACT

The present disclosure describes techniques for implementing password resetting control. A control column comprises a variable configured to restrict an authority of a privileged user to reset passwords for owners or viewers of privacy-preserving columns. A default setting of the variable has a first value. A first instruction of granting a first user as an owner or a viewer of a first privacy-preserving column is received. A value of the variable corresponding to the first user is automatically switched from the first value to a second value in response to determining that the first user is granted as the owner or the viewer for a first time. The first value indicates that the privileged user has the authority to reset a password for the first user. The second value indicates that the privileged user lacks the authority to reset the password for the first user.

20 Claims, 12 Drawing Sheets

(56) References Cited

U.S. PATENT DOCUMENTS

| | | | | |
|---|---|---|---|---|
| 2012/0030119 | A1* | 2/2012 | Little | G06Q 20/40 715/764 |
| 2013/0191650 | A1* | 7/2013 | Balakrishnan | G06F 21/6227 713/190 |
| 2014/0325620 | A1* | 10/2014 | Samson | H04L 63/083 718/100 |
| 2016/0352702 | A1* | 12/2016 | Gallant | G06F 21/31 |
| 2018/0041336 | A1* | 2/2018 | Keshava | H04L 9/0891 |
| 2018/0150650 | A1* | 5/2018 | Saunders | H04L 63/104 |
| 2019/0098055 | A1* | 3/2019 | Pitre | H04L 63/20 |
| 2024/0232325 | A1* | 7/2024 | Arai | G06F 21/45 |
| 2026/0023864 | A1* | 1/2026 | Bogrett | G06F 21/604 |

OTHER PUBLICATIONS

Antonopoulos et al.; "Azure SQL Database Always Encrypted"; ACM SIGMOD Int'l Conf. on Management of Data; Jun. 2020; p. 1511-1525.
Arasu et al.; "Orthogonal Security With Cipherbase"; 6th Biennial Conf. on Innovative Data Systems Reseach; Jan. 2013; 10 pages.
"What is Data Masking"; https://aws.amazon.com/what-is/data-masking/; Amazon Web Services; © 2025; accessed Sep. 4, 2025; 7 pages.
"Encryption at rest"; https://cloud.google.com/bigquery/docs/encryption-at-rest; Google; accessed Sep. 4, 2025; 3 pages.
"Introduction to BigQuery row-level security"; https://cloud.google.com/bigquery/docs/row-level-security-intro; Google; accessed Sep. 4, 2025; 11 pages.
"Introduction to column-level access control"; https://cloud.google.com/bigquery/docs/column-level-security-intro; Google; accessed Sep. 4, 2025; 14 pages.
"Introduction to data masking"; https://cloud.google.com/bigquery/docs/column-data-masking-intro; Google; accessed Sep. 4, 2025; 25 pages.
Boldyreva et al.; "Order-Preserving Encryption Revisited: Improved Security Analysis and Alternative Solutions"; Advances in Cryptology; CRYPTO 2011; 43 pages.
"Volcano Engine—Your AI Cloud"; https://www.volcengine.com/; Beijing Volcano Engine Technology Co. Ltd.; © 2025; accessed Sep. 4, 2025; 5 pages.
"Make Everything a breeze"; https://www.larksuite.com/; Unable to locate site.
"Cassandra Documentation"; https://cassandra.apache.org/doc/4.1/cassandra/operating/security.html; The Apache Software Foundation; © 2009-2025; accessed Sep. 5, 2025; 17 pages.
Cheng et al.; "Intel TDX Demystified: A Top-Down Approach"; Cryptography and Security; arXiv:2303.15540; Mar. 2023; 33 pages.
Cheon et al.; "Homomorphic Encryption for Arithmetic of Approximate Numbers"; Advances in Cryptology—ASIACRYPT; 2017; 23 pages.
"Enable PolarDB always-confidential"; https://www.alibabacloud.com/help/en/polardb/polardb-for-mysql/user-quide/enable-confidential-engine; Alibaba Cloud; © 2009-2025; accessed Sep. 5, 2025; 6 pages.
"Functional Support"; https://help.aliyun.com/zh/rds/apsaradb-rds-for-postgresql/supported-features; Aliyun; © 2009-2025; accessed Sep. 5, 2025; 75 pages.
"Encryption"; https://docs.couchbase.com/server/current/learn/security/encryption-overview.html; CouchBase; accessed Sep. 5, 2025; 3 pages.
Daemen et al.; "AES Proposal: Rijndael"; 1999; 91 pages.
"Introduction to Transparent Data Encryption"; https://docs.oracle.com/en/database/oracle/oracle-database/21/asoag/introduction-to-transparent-data-encryption.html; Oracle; accessed Sep. 5, 2025; 15 pages.
"Create Mask statement"; https://www.ibm.com/docs/en/db2-for-zos/12.0.0?topic=statements-create-mask; IBM; Mar. 2025; accessed Sep. 5, 2025; 13 pages.
"Encryption of data at rest"; https://www.ibm.com/docs/en/db2/11.5.x?topic=encryption-data-rest; IBM; Aug. 2025; accessed Sep. 5, 2025; 2 pages.
"Label-based access control (LBAC) overview"; https://www.ibm.com/docs/en/db2/11.5.x?topic=security-label-based-access-control-lbac; IBM; Aug. 2025; accessed Sep. 5, 2025; 4 pages.
"DynamoDB encryption at rest"; https://docs.aws.amazon.com/amazondynamodb/latest/developerguide/EncryptionAtRest.html; Amazon Web Services; © 2025; accessed Sep. 5, 2025; 4 pages.
Ekberg et al.; "Trusted execution environments on mobile devices"; ACM SIGSAC Conf. on Computer & Communication Security; 2013; p. 1497-1499.
El Hindi et al.; "Benchmarking the Second Generation of Intel SGX Hardware"; 18th Int'l Workshop on Data Management on New Hardware; Jun. 2022; 8 pages.
"MySQL Enterprise Masking and De-identification"; https://www.mysql.com/products/enterprise/masking.html; Oracel; © 2025; accessed Sep. 5, 2025; 2 pages.
"Intel® TDX Connect Architecture Specification"; https://www.intel.com/content/www/us/en/content-details/773614/intel-tdx-connect-architecture-specification.html; Intel; Mar. 2023; 40 pages.
C. Gentry; "Fully homomorphic encryption using ideal lattices"; 41st Annual ACM Symposium on Theory of Computing; 2009; p. 169-178.
O. Goldreich; Foundations of Cryptography; vol. 2; 2004 (book).
"Data Masking"; https://help.sap.com/docs/hana-cloud-database/sap-hana-cloud-sap-hana-database-security-guide/data-masking; SAP; 2004; accessed Sep. 8, 2025; 4 pages.
K. Kollenda; "General overview of AMD SEV-SNP and Intel TDX"; https://sys.cs.fau.de/extern/lehre/ws22/akss/material/amd-sev-intel-tdx.pdf; 2023; 8 pages.
Lee et al.; "Keystone: an open framework for architecting trusted execution environments"; 15th European Conf. on Computer Systems; 2020; 16 pages.
Li et al.; "Design and Verification of the Arm Confidential Compute Architecture"; 16th USENIX Symposium on Operating Systems Design and Implementation; Jul. 2022; p. 465-484.
MongoDB Data Encryption; https://www.mongodb.com/products/capabilities/security/encryption; MongoDB Inc.; © 2025; accessed Sep. 9, 2025; 11 pages.
Queryable Encryption; https://www.mongodb.com/docs/v7.0/core/queryable-encryption/; MongoDB Inc.; © 2025; accessed Sep. 9, 2025; 11 pages.
"Working With Sensitive Data While Keeping It Secure: A Guide to Data Masking"; https://www.mongodb.com/resources/products/capabilities/working-with-sensitive-data-while-keeping-it-secure-a-guide-to-data-masking; MongoDB Inc.; © 2025; accessed Sep. 9, 2025; 4 pages.
Encryption and Compression Functions; https://dev.mysql.com/doc/refman/8.0/en/encryption-functions.html#function_aes-encrypt; Oracle; © 2025; accessed Sep. 9, 2025; 12 pages.
MySQL Enterprise Encryption Usage and Examples; https://dev.mysql.com/doc/refman/8.0/en/enterprise-encryption-usage.html; Oracle; © 2025; accessed Sep. 9, 2025; 3 pages.
MySQL Enterprise Masking and De-identification; https://www.mysql.com/products/enterprise/masking.html; Oracle; © 2025; accessed Sep. 9, 2025; 2 pages.
Using the MySQL Enterprise Data Masking and De-identification Plugin; https://dev.mysql.com/doc/refman/8.4/en/data-masking-plugin-usage.html; Oracle; © 2025; accessed Sep. 9, 2025; 9 pages.
Ogburn et al.; "Homomorphic Encryption"; Procedia Computer Science; vol. 20; 2013; p. 502-509.
SQL Functions; https://docs.oracle.com/cd/E12095_01/doc.10303/e12092/sqfunc.htm; Oracle; © 1997; accessed Sep. 9, 2025; 46 pages.
Data Masking and Subsetting; https://www.oracle.com/security/database-security/data-masking/; Oracle; © 2025; accessed Sep. 9, 2025; 10 pages.
Implementing Application Context and Fine-Grained Access Control; https://docs.oracle.com/cd/B14117_01/network.101/b10773/apdvcntx.htm; Oracle; © 2003; accessed Sep. 9, 2025; 35 pages.

(56) References Cited

OTHER PUBLICATIONS

Using Oracle Virtual Private Database to Control Data Access; https://docs.oracle.com/en/database/oracle/oracle-database/19/dbseg/using-oracle-vpd-to-control-data-access.html; Oracle; accessed Sep. 9, 2025; 81 pages.
Poddar et al.; "Arx: An Encrypted Database using Semantically Secure Encryption"; Cryptology ePrint Archive; 2024; 23 pages.
Poddar et al.; "Arx: An Encrypted Database using Semantically Secure Encryption"; VLDB Endowment; vol. 12 No. 11; 2019; p. 1664-1678.
Row Security Policies; https://www.postgresql.org/docs/current/ddl-rowsecurity.html; The PostgreSQL Global Group; © 1996-2025; accessed Sep. 9, 2025; 7 pages.
Priebe et al.; "EnclaveDB: A Secure Database Using SGX"; IEEE Symposium on Security and Privacy; 2018; p. 264-278.
Encrypting Amazon RDS resources; https://docs.aws.amazon.com/AmazonRDS/latest/UserGuide/Overview.Encryption.html; Amazon Web Services; © 2025; accessed Sep. 9, 2025; 10 pages.
Encryption at rest; https://redis.io/docs/latest/operate/rc/security/encryption-at-rest/; Redis; accessed Sep. 9, 2025; 5 pages.
Dynamic data masking; https://docs.aws.amazon.com/redshift/latest/dg/t_ddm.html; Amazon Web Services; © 2025; accessed Sep. 9, 2025; 3 pages.
Dynamic data masking; https://learn.microsoft.com/en-us/sql/relational-databases/security/dynamic-data-masking?view=sql-server-ver16; Microsoft; Jun. 2025; accessed Sep. 9, 2025; 15 pages.
Row-level security; https://learn.microsoft.com/en-us/sql/relational-databases/security/row-level-security?view=sql-server-ver16; Microsoft; Nov. 2024; accessed Sep. 9, 2025; 23 pages.
Transparent data encryption (TDE); https://learn.microsoft.com/en-us/sql/relational-databases/security/encryption/transparent-data-encryption?view=sql-server-ver17; Microsoft; Sep. 2025; accessed Sep. 9, 2025; 14 pages.
AMD SEV-SNP: Strengthening VM Isolation with Integrity Protection and More; White Paper; AMD; Jan. 2020; 20 pages.
Shen et al.; "Occlum: Secure and Efficient Multitasking Inside a Single Enclave of Intel SGX"; $25^{th}$ Int'l Conf. on Architectural Support for Programming Languages and Operating Systems; 2020; p. 955-970 (Abstract Only).
Intel® Trust Domain Extensions (Intel® TDX); https://www.intel.com/content/www/us/en/developer/tools/trust-domain-extensions/overview.html; Intel Corporation; accessed Sep. 10, 2025; 4 pages.
Understanding end-to-end encryption in Snowflake; https://docs.snowflake.com/en/user-guide/security-encryption-end-to-end; SnowFlake; accessed Sep. 10, 2025; 6 pages.
Understanding row access policies; https://docs.snowflake.com/en/user-guide/security-row-intro; SnowFlake; accessed Sep. 10, 2025; 28 pages.
Using Dynamic Data Masking; https://docs.snowflake.com/en/user-guide/security-column-ddm-use; SnowFlake; accessed Sep. 10, 2025; 12 pages.
Transparent data encryption (TDE) with customer-managed keys at the database level; https://learn.microsoft.com/en-us/azure/azure-sql/database/transparent-data-encryption-byok-database-level-overview?view=azuresql&tabs=azurekeyvault; Microsoft; accessed Sep. 10, 2025; 15 pages.
Tsai et al.; "Graphene-SGX: A Practical Library OS for Unmodified Applications on SGX"; USENIX Annual Technical Conference; Jul. 2017; p. 645-658.
Vinayagamurthy et al.; "StealthDB: a Scalable Encrypted Database with Full SQL Query Support"; Proceedings on Privacy Enhancing Technology Symposium; vol. 3; 2019; p. 370-388.
VeDB for MySQL; https://www.volcengine.com/product/vedb-mysql; Beijing Volcano Engine Technology Co. Ltd.; © 2025; accessed Sep. 10, 2025; 10 pages.
Volos et al.; "Graviton: Trusted Execution Environments on GPUs"; 13th USENIX Symposium on Operating Systems Design and Implementation; Oct. 2018; p. 681-696.
Yang et al.; "SecuDB: An In-Enclave Privacy-Preserving and Tamper-Resistant Relational Database"; VLDB Endowment; vol. 17 No. 12; 2024; p. 3906-3919.
Yang et al.; "VeDB: A Software and Hardware Enabled Trusted Relational Database"; ACM on Management of Data; vol. 1 Article 194; 2023; 27 pages.
Zhang et al.; "Shelter: Extending Arm CCA with Isolation in User Space"; 32nd USENIX Security Symposium; Aug. 2023; p. 6257-6274.

* cited by examiner

| ColID | Owner | Viewer |
| --- | --- | --- |
| col_id1 | user3 | user2 |
| col_id2 | user2 | user3 |

| UserID | User Name | ... | Hibernate |
| --- | --- | --- | --- |
| uid1 | user1 | ... | False |
| uid2 | user2 | ... | True |
| uid3 | user3 | ... | True |

212

| ColID (302) | Owner (304) | Viewer (306) |
| --- | --- | --- |
| col_id1 | user3 | user1 |
| col_id2 | user2 | user3 |

| UserID (312) | User Name (314) | . . . | Hibernate (316) |
| --- | --- | --- | --- |
| uid1 | user1 | . . . | True |
| uid2 | user2 | . . . | True |
| uid3 | user3 | . . . | True |

FIG. 4B

| ColID | Owner | Viewer |
|---|---|---|
| col_id1 | user3 | user1 |
| col_id2 | user1 | user3 |

| UserID | User Name | . . . | Hibernate |
|---|---|---|---|
| uid1 | user1 | . . . | True |
| uid2 | user2 | . . . | False |
| uid3 | user3 | . . . | True |

600

Create a control column in a database user catalog table, wherein the control column comprises a variable configured to restrict an authority of a privileged user to reset passwords for owners or viewers of fine-grained privacy-preserving columns, wherein the fine-grained privacy-preserving columns contain secret information, and wherein the variable is a binary variable, wherein a default setting of the variable has a first value 602

Receive a first instruction of granting a first user as an owner or a viewer of a first fine-grained privacy-preserving column, wherein the first fine-grained privacy-preserving column is any of the fine-grained privacy-preserving columns 604

Automatically switch a value of the variable corresponding to the first user from the first value to a second value in response to determining that the first user is granted as the owner or the viewer for a first time, wherein the first value of the variable indicates that the privileged user has the authority to reset a password for the first user, and wherein the second value of the variable indicates that the privileged user lacks the authority to reset the password for the first user 606

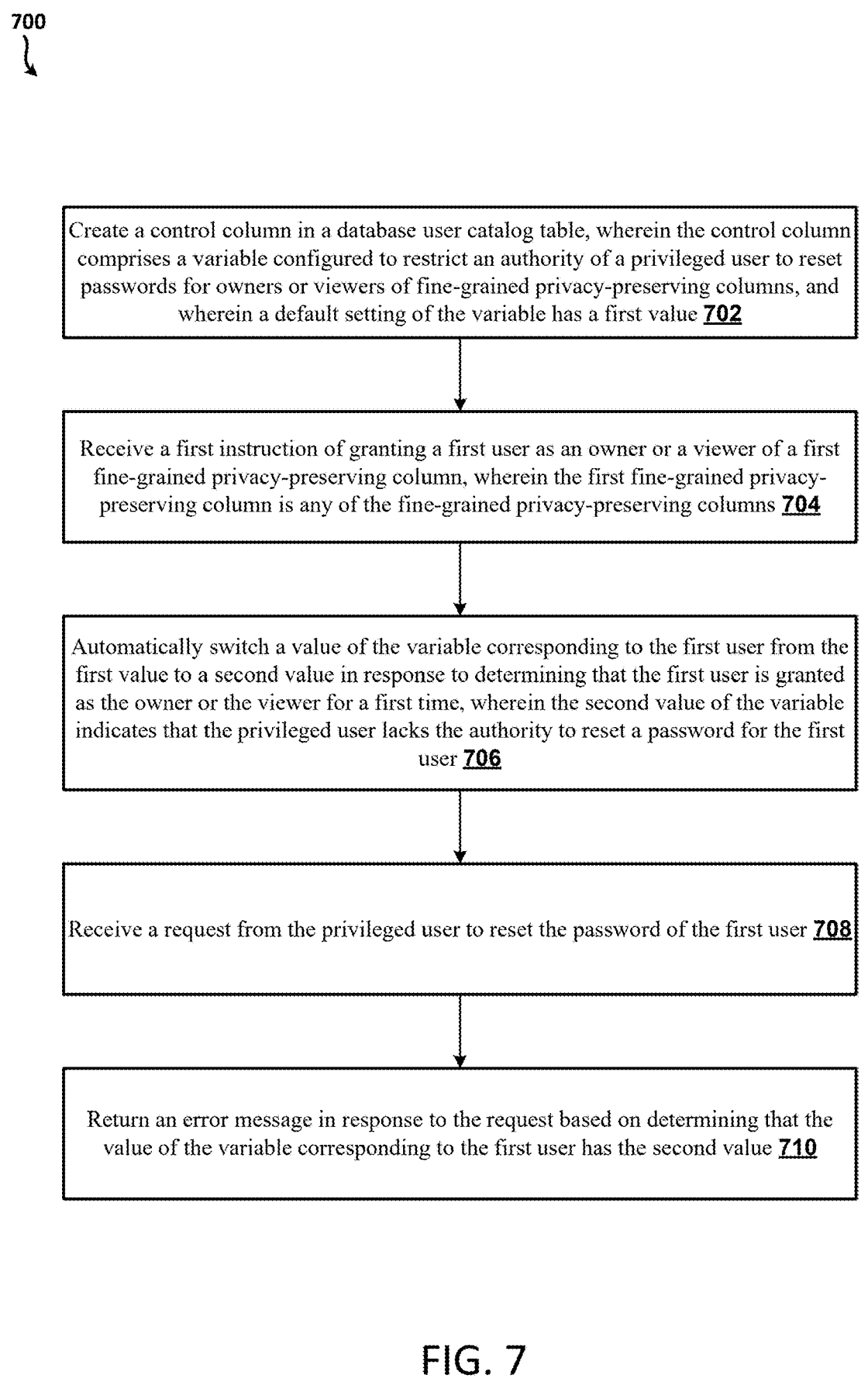

Create a control column in a database user catalog table, wherein the control column comprises a variable configured to restrict an authority of a privileged user to reset passwords for owners or viewers of fine-grained privacy-preserving columns, and wherein a default setting of the variable has a first value 702

Receive a first instruction of granting a first user as an owner or a viewer of a first fine-grained privacy-preserving column, wherein the first fine-grained privacy-preserving column is any of the fine-grained privacy-preserving columns 704

Automatically switch a value of the variable corresponding to the first user from the first value to a second value in response to determining that the first user is granted as the owner or the viewer for a first time, wherein the second value of the variable indicates that the privileged user lacks the authority to reset a password for the first user 706

Receive a request from the privileged user to reset the password of the first user 708

Return an error message in response to the request based on determining that the value of the variable corresponding to the first user has the second value 710

FIG. 7

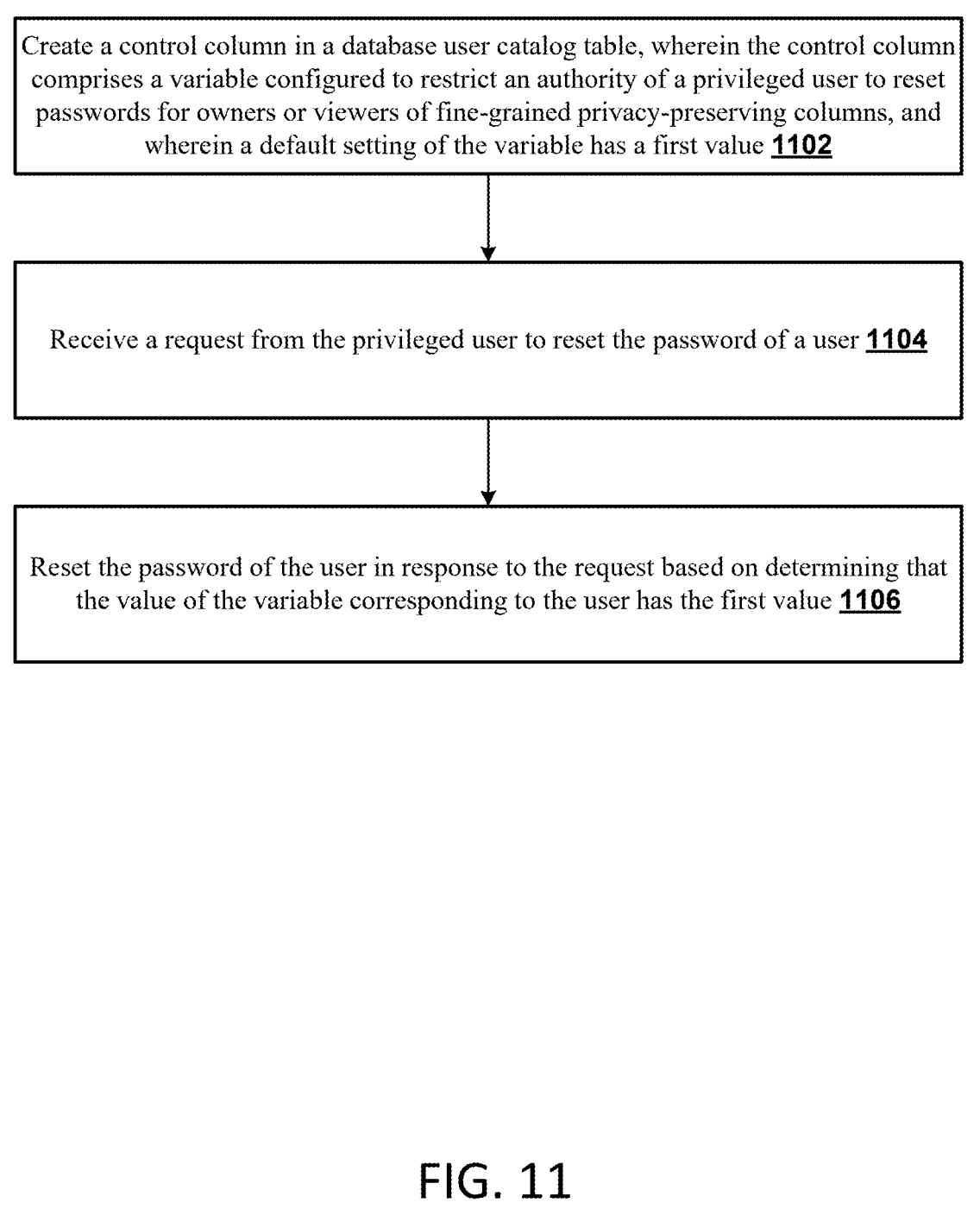

Create a control column in a database user catalog table, wherein the control column comprises a variable configured to restrict an authority of a privileged user to reset passwords for owners or viewers of fine-grained privacy-preserving columns, and wherein a default setting of the variable has a first value 1102

Receive a request from the privileged user to reset the password of a user 1104

Reset the password of the user in response to the request based on determining that the value of the variable corresponding to the user has the first value 1106

FIG. 11

IMPLEMENTING PASSWORD RESETTING CONTROL IN A DATABASE CONTAINING SECRET INFORMATION

BACKGROUND

Certain data may be sensitive or confidential. Permission to such data may be restricted to a particular set of parties. For example, sensitive or confidential data may be encrypted so that only authorized parties can access it. As the quantity of sensitive or confidential data continues to increase, people continue to desire new ways for maintaining the privacy of sensitive or confidential data.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4A shows an example secret column catalog table in accordance with the present disclosure.

FIG. 4B shows an example database user catalog table in accordance with the present disclosure.

FIG. 6 shows an example process for implementing password resetting control in a database containing secret information in accordance with the present disclosure.

FIG. 7 shows an example process for implementing password resetting control in a database containing secret information in accordance with the present disclosure.

FIG. 11 shows an example process for implementing password resetting control in a database containing secret information in accordance with the present disclosure.

DETAILED DESCRIPTION OF ILLUSTRATIVE EMBODIMENTS

An in-enclave (e.g., fully hardware encrypted) relational database that supports privacy-preserving and verifiable functionalities can be implemented by residing an entire database management system (DBMS) in a hardware-based security engine that isolates and protects data in use against attack within a virtual machine (VM). In this fully hardware encrypted database architecture, all memory, central processing unit(s), and input/output (I/O) security can be protected from data leaks. Thus, any DBMS internally used data structures and data stores that do not have explicit retrieval interfaces cannot be viewed by adversaries, such as system and physical logs.

When creating or altering a table in this hardware encrypted database architecture, a privacy-preserving column can be defined with an additional keyword "SECRET." The owner and/or viewer(s) of the secret column can see the plaintext. Other users cannot observe the plaintext in any way, such as for data retrieval, predicate handling, log probing, or statistic viewing. The owner can execute data control language (DCL) operations to grant column visibility to another user (e.g., using the command "GRANT VIEWER DCL") and to remove or revoke viewing rights from a user (e.g., using a "DENY" or "REVOKE" command). Further, an owner of a privacy-preserving column can transfer the ownership of the privacy-preserving column to another user using DCL operations. If the owner transfers the ownership of the privacy-preserving column to another user, the original owner can be automatically downgraded to a viewer of the privacy-preserving column.

These DCL operations can be only executed by the secret column owner to prevent unexpected operations from highly privileged users, such as database administrators (DBAs) or database root users that possess control over the entire software stack on the database server. However, malicious highly privileged users can, in some instances, reset the passwords of secret column owners and/or viewers in order to gain ownership of a secret column and/or to gain the right to view the plaintext in the secret column. As such, techniques for implementing database user password resetting control are needed.

Figure 1:
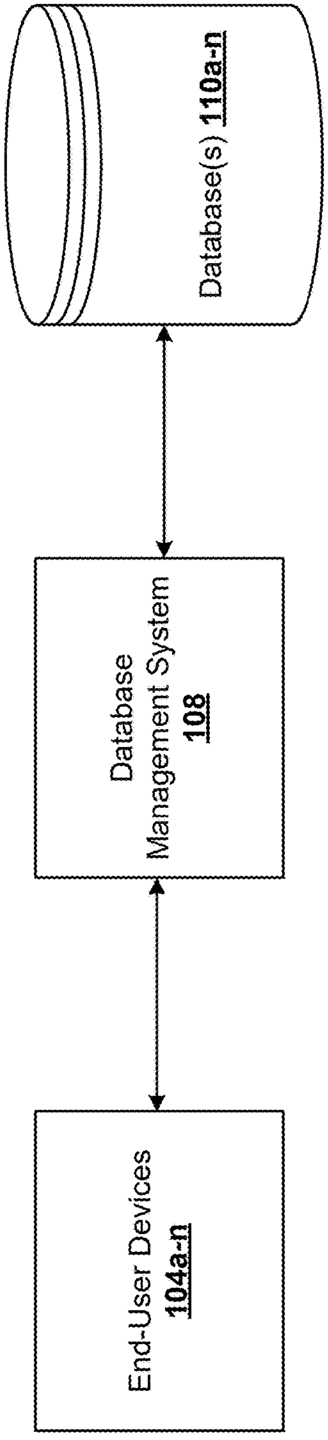
FIG. 1 shows an example system for implementing password resetting control in a database containing secret information in accordance with the present disclosure.

Described here are techniques for restricting an authority to reset database user passwords. The techniques described herein prevent highly privileged users from resetting the password of a user if that user is a viewer or an owner of any privacy-preserving column in the database. FIG. 1 shows an example system 100 for implementing password resetting control in a database containing secret information in accordance with the present disclosure. The system 100 includes a plurality of end user devices 104*a-n*, a DBMS 108, and at least one database 110.

The at least one database 110 can store data, such as in the form of one or more tables. Each of the table(s) can include one or more fine-grained privacy-preserving columns. Each fine-grained privacy-preserving column can include secret information. Each fine-grained privacy-preserving column can be defined with the additional keyword "SECRET." Only an owner of a particular fine-grained privacy-preserving column can be allowed to execute DCL operations associated with that fine-grained privacy-preserving column. The owner of the particular fine-grained privacy-preserving column can be associated with one or more of the plurality of end user devices 104*a-n*. Only the one or more end user devices associated with the owner can be used to execute DCL operations associated with that fine-grained privacy-preserving column. The owner of a particular fine-grained privacy-preserving column can grant column visibility to another user (e.g., using the command "GRANT VIEWER DCL") and to remove or revoke viewing rights from a user (e.g., using a "DENY" or "REVOKE" command).

The DBMS 108 can create a secret column catalog table. The secret column catalog table can be configured to record ownership information of the fine-grained privacy-preserving columns. For example, the catalog table can be configured to record a current owner of each the fine-grained privacy-preserving columns. Further, the secret column catalog table can be configured to record viewer information for the fine-grained privacy-preserving columns that store secret information. For example, the secret column catalog table can be configured to record a current viewer of each fine-grained privacy-preserving column. The DBMS 108 can automatically update the secret column catalog table as the owners and/or viewers of the fine-grained privacy-preserving columns are changed.

The DBMS 108 can create a database user catalog table. Each row of the database user catalog table can correspond to a particular user. The database user catalog table can include a control column. The control column can include a variable configured to restrict an authority of a privileged user to reset passwords for owners or viewers of fine-grained privacy-preserving columns. The variable can be a binary variable. The default setting of the variable can be a first value (e.g., false). If a first user is neither the owner nor the viewer of any of the fine-grained privacy-preserving columns (e.g., as indicated by the secret column catalog table), the variable in the control column of the row corresponding to the first user can be set to the first value. If the variable has the first value, this can indicate that highly privileged users have the authority to reset a password for the first user.

The DBMS 108 can receive a first instruction. The first instruction can include an instruction to grant a first user as an owner or a viewer of a first fine-grained privacy-preserving column among the fine-grained privacy-preserving columns in the at least one database 110. The first instruction can include an instruction from the first user to add the first fine-grained privacy-preserving column to the database (e.g., an instruction to create the first fine-grained privacy-preserving column). The first instruction can include an instruction from an owner of the first fine-grained privacy-preserving column to transfer an ownership of the first fine-grained privacy-preserving column to the first user. The first instruction can include an instruction from the owner of the first fine-grained privacy-preserving column to grant the first user as a viewer of the first fine-grained privacy-preserving column.

The DBMS 108 can execute the first instruction. To execute the first instruction, the DBMS 108 can automatically update the secret column catalog table in response to receiving the first instruction. For example, the DBMS 108 can update the secret column catalog table to indicate that the first user is the owner or the viewer of the first fine-grained privacy-preserving column. Further, the DBMS 108 can automatically update the database user catalog table in response to receiving the first instruction and/or in response to updating the secret column catalog table to indicate that the first user is the owner or the viewer of the first fine-grained privacy-preserving column. The DBMS 108 can automatically update the database user catalog table by switching the value of the variable corresponding to the first user from the first value to a second value. The DBMS 108 can switch the value of the variable corresponding to the first user from the first value to a second value in response to determining that the first user is granted as the owner or the viewer of one of the fine-grained privacy-preserving columns for the first time.

If the variable corresponding to the first user has the second value, this can indicate that highly privileged users lack the authority to reset a password for the first user. The DBMS 108 can receive a request from a highly privileged user to reset the password of the first user. The DBMS 108 will not reset the password of the first user based on determining that the value of the variable corresponding to the first user has the second value. Instead, the DBMS 108 can return an error message to the highly privileged user in response to the request based on determining that the value of the variable corresponding to the first user has the second value.

A second user can be an owner or a viewer of a second fine-grained privacy-preserving column among the fine-grained privacy-preserving columns in the at least one database 110. The secret column catalog table can indicate that the second user is the owner or the viewer of the second fine-grained privacy-preserving column. If the second user is the owner or the viewer of the second fine-grained privacy-preserving column, the variable in the database user catalog table corresponding to the first user can be set to the second value. If the variable has the second value, this indicates that highly privileged user(s) lack the authority to reset a password for the second user.

The DBMS 108 can receive a second instruction. The second instruction can include an instruction to revoke the owner or viewer right of the second user with respect to the second fine-grained privacy-preserving column. The second instruction can include an instruction to transfer or revoke ownership of the second fine-grained privacy-preserving column from the second user. The second instruction can include an instruction from an owner of the second fine-grained privacy-preserving column to revoke the second user's right of viewing the second fine-grained privacy-preserving column. The second instruction can include an instruction to modify the second fine-grained privacy-preserving column so that it is no longer a secret column.

The DBMS 108 can execute the second instruction. To execute the second instruction, the DBMS 108 can automatically update the secret column catalog table in response to receiving the second instruction. For example, the DBMS 108 can update the secret column catalog table to indicate that the second user is no longer the owner or the viewer of the second fine-grained privacy-preserving column.

The DBMS 108 can determine whether the second user has owner or viewer right associated with any other fine-grained privacy-preserving column after executing the second instruction. The DBMS 108 can determine whether the second user has owner or viewer right associated with any other fine-grained privacy-preserving column by searching all records in the secret column catalog table. If the DBMS 108 determines that the user has owner or viewer right associated with at least one other fine-grained privacy-preserving column, the DBMS 108 can maintain the value of the variable in the database user catalog table corresponding to the second user as the second value. Conversely, if the DBMS 108 determines that the user does not have owner or viewer rights associated with any fine-grained privacy-preserving column, the DBMS 108 can automatically switch the value of the variable in the database user catalog corresponding to the second user from the second value to the first value.

If the variable corresponding to the second user has the first value, this can indicate that highly privileged users have the authority to reset a password for the second user. The DBMS 108 can receive a request from a highly privileged user to reset the password of the second user. In response to receiving the request, the DBMS 108 can reset the password of the second user based on determining that the value of the variable corresponding to the second user has the first value.

Figure 2:
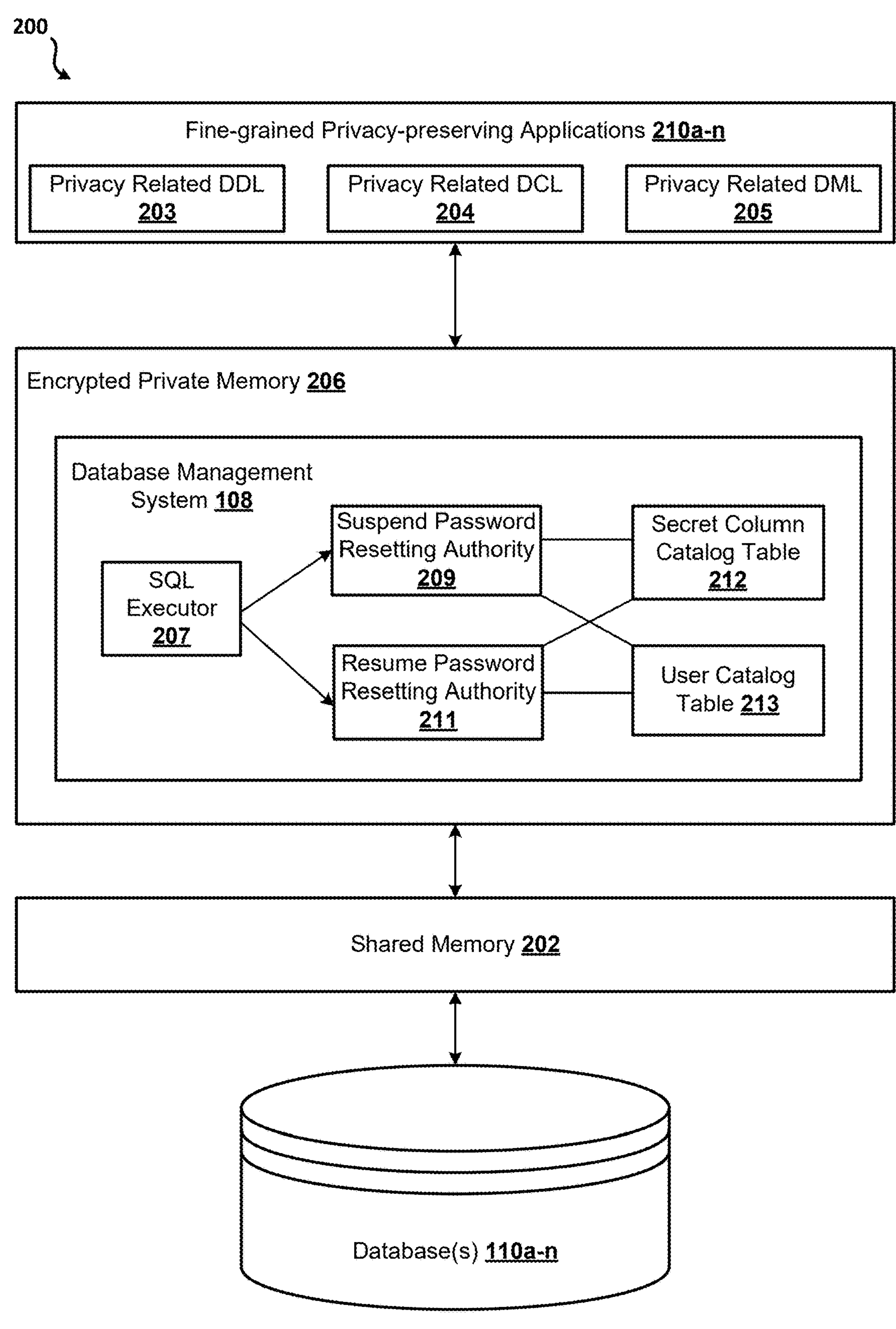
FIG. 2 shows an example system for implementing password resetting control in a database containing secret information in accordance with the present disclosure.

FIG. 2 shows an example system 200 for implementing password resetting control in a database containing secret information in accordance with the present disclosure. The system 200 includes the DBMS 108 and the at least one database 110. The DBMS 108 can be contained in an encrypted private memory 206. The DBMS 108 can be in communication with the at least one database 110 via shared memory 202.

The DBMS 108 can support fine-grained privacy-preserving application(s) 210*a-n*. Each of the fine-grained privacy-preserving application(s) 210*a-n* can include one or more of a privacy related data definition language (DDL) 203, a privacy related data control language (DCL) 204, or a privacy related data manipulation language (DML) 205. To fulfill flexible data privacy, the fined-grained approach can be utilized to protect privacy at the column level. For example, an employee data table can contain sensitive information such as salary information. The DBMS 108 has to guarantee that no users other than human resource roles, including database administrators, can view the contents. The DBMS 108 can include a SQL engine 207. The SQL engine 207 can receive commands (e.g., SQL commands) from end users (e.g., from end-user devices 104*a-n*). In response to the commands received from the end users, the SQL engine 207 can cause suspension of password resetting authority 209 and resuming of password resetting authority 211, as described above with regard to FIG. 1. For example, the SQL engine 207 can update the value of the variable in the control column of the database user catalog table 213 using the viewer and owner rights stored in the secret column catalog table 212.

The DBMS 108 can rely on a trust execution environment (TEE)-based virtual machine (VM) environment. The TEE-based VM environment can provide execution domain isolation by encryption of memory and registers, integrity measurement, and remote attestation to ensure data confidentiality. VM instances do not require additional development of a library operating system (OS) to support application workloads, thereby conserving engineering resources. Moreover, VM instances have the ability to fully utilize all CPU and memory resources available on a physical node. This advantage facilitates the management of large-memory workloads entirely within secure memory, minimizing I/O operations and boosting performance significantly.

Figures 3A, 3B:
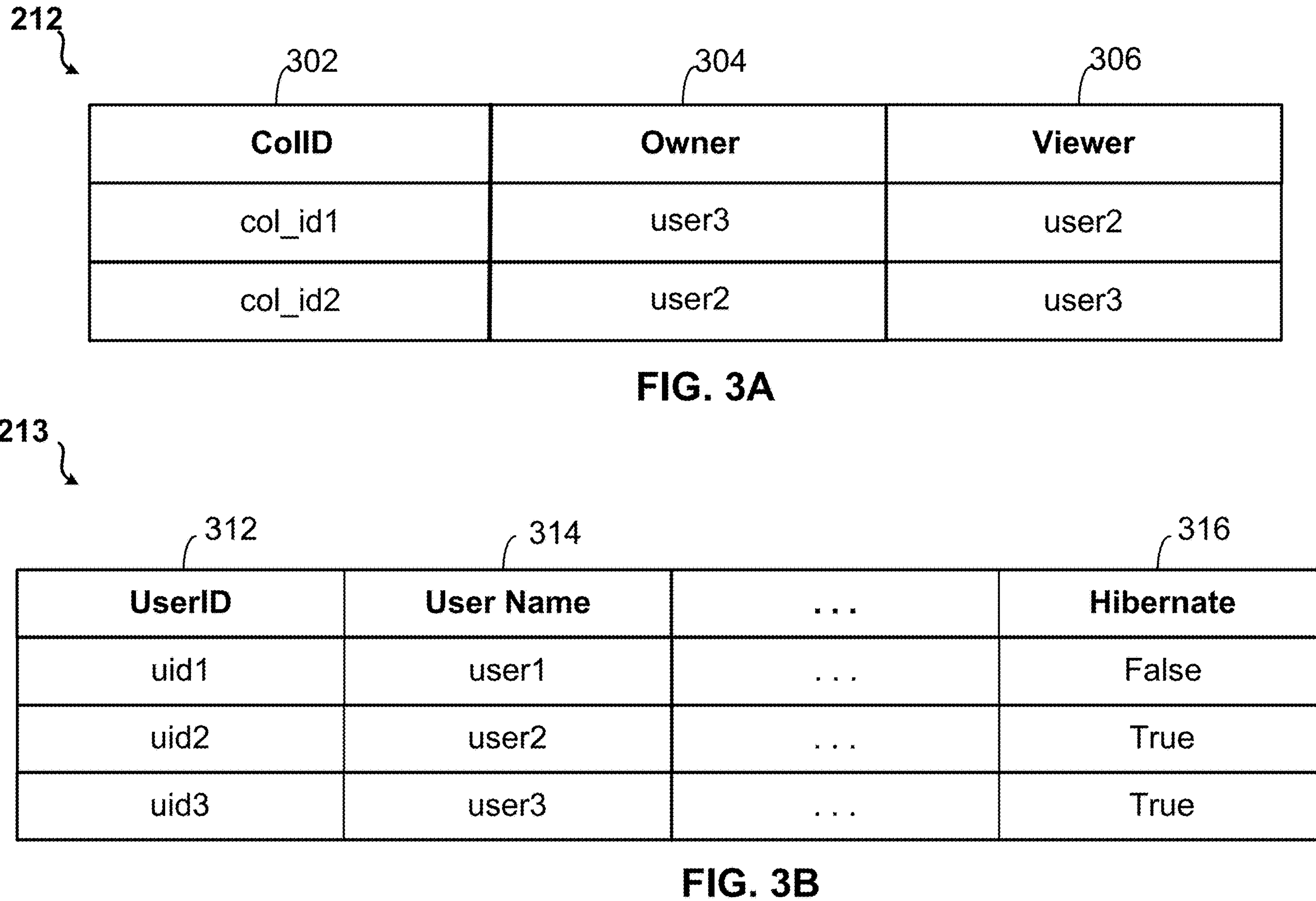
FIG. 3A shows an example secret column catalog table in accordance with the present disclosure.
FIG. 3B shows an example database user catalog table in accordance with the present disclosure.

FIG. 3A shows an example secret column catalog table 212. A DBMS (e.g., the DBMS 108) can create the secret column catalog table 212. The secret column catalog table 212 can be configured to record ownership information of fine-grained privacy-preserving columns that store secret information. For example, the secret column catalog table 212 can be configured to record a current owner of each fine-grained privacy-preserving column. Further, the secret column catalog table 212 can be configured to record viewer information for the fine-grained privacy-preserving columns that store secret information. For example, the secret column catalog table 212 can be configured to record a current viewer of each fine-grained privacy-preserving column.

The secret column catalog table 212 can include first column 302, a second column 304, and a third column 306. The first column 302 can be configured to record identification information of the fine-grained privacy-preserving columns. The second column 304 can be configured to record information indicative of a current owner of the corresponding fine-grained privacy-preserving columns. The third column 306 can be configured to record information indicative of a current viewer of the corresponding fine-grained privacy-preserving columns. The secret column catalog table 212 can be automatically updated to record ownership transfers and/or the granting or revoking of viewing rights associated with the fine-grained privacy-preserving columns.

In the example secret column catalog table 212 of FIG. 3A, user 3 is the owner of a first fine-grained privacy-preserving column (e.g., a fine-grained privacy-preserving column associated with col_id1) and user 2 is the viewer of the first fine-grained privacy-preserving column. Similarly, user 2 is the owner of a second fine-grained privacy-preserving column (e.g., a fine-grained privacy-preserving column associated with col_id2) and user 3 is the viewer of the second fine-grained privacy-preserving column.

FIG. 3B shows an example database user catalog table 213 corresponding to the secret column catalog table 212 of FIG. 3A. Each row of the database user catalog table 213 can correspond to a particular user. The database user catalog table 213 can include first column 312, a second column 314, and a third column 316. The first column 312 can be configured to record user identifiers. The second column 314 can be configured to record user names. The third column 316 (e.g., the control column) can include a variable (e.g., hibernate) configured to restrict an authority of a privileged user to reset passwords for owners or viewers of fine-grained privacy-preserving columns. The variable can be a binary variable. The default setting of the variable can be a first value (e.g., false).

If a user is neither the owner nor the viewer of any of the fine-grained privacy-preserving columns (e.g., as indicated by the secret column catalog table), the variable in the control column of the row corresponding to that user can be set to the first value. If the variable has the first value, this indicates that highly privileged users have the authority to reset a password for that user. Conversely, if a user is either the owner or a viewer of any one of the fine-grained privacy-preserving columns (e.g., as indicated by the secret column catalog table 212), the variable in the control column of the row corresponding to that user can be set to a second value (e.g., true). If the variable has the second value, this indicates that highly privileged users do not have the authority to reset a password for that user.

As described above with respect to FIG. 3A, user 3 is the owner of the first fine-grained privacy-preserving column (e.g., a fine-grained privacy-preserving column associated with col_id1) and the viewer of the second fine-grained privacy-preserving column (e.g., a fine-grained privacy-preserving column associated with col_id2), while user 2 is the viewer of the first fine-grained privacy-preserving column and the owner of the second fine-grained privacy-preserving column. As such, in the example database user catalog table 213 of FIG. 3B, the variable in the control column in the rows corresponding to user 2 and user 3 has the second value. Because user 1 is neither the owner nor the viewer of any of the fine-grained privacy-preserving columns, the variable in the control column in the row corresponding to user 1 has the first value.

The DBMS 108 can receive a first instruction to grant user 1 as the viewer of the first fine-grained privacy-preserving column. DBMS 108 can receive the first instruction to grant user 1 as the viewer of the first fine-grained privacy-preserving column from the owner of the first fine-grained privacy-preserving column (e.g., user 3). The DBMS 108 can execute the first instruction. As shown in FIG. 4A, to execute the first instruction, the DBMS 108 can automatically update the secret column catalog table 212 in response to receiving the first instruction. For example, the secret column catalog table 212 can be updated to indicate that user 1 is now a viewer of the first fine-grained privacy-preserving column (user 2 may or may not still be a viewer of the of the first fine-grained privacy-preserving column).

Further, as shown in FIG. 4B, the DBMS 108 can automatically update the database user catalog table 213 in response to receiving the first instruction and/or in response to updating the secret column catalog table 212 to indicate that user 1 is now a viewer of the first fine-grained privacy-preserving column. The DBMS 108 can automatically update the database user catalog table based on switching the value of the variable corresponding to user 1 from the first value (e.g., false) to the second value (e.g., true). Switching the value of the variable corresponding to user 1 from the first value (e.g., false) to the second value (e.g., true) suspends the authority of highly privilege users to reset the password of user 1.

Figures 5A, 5B:
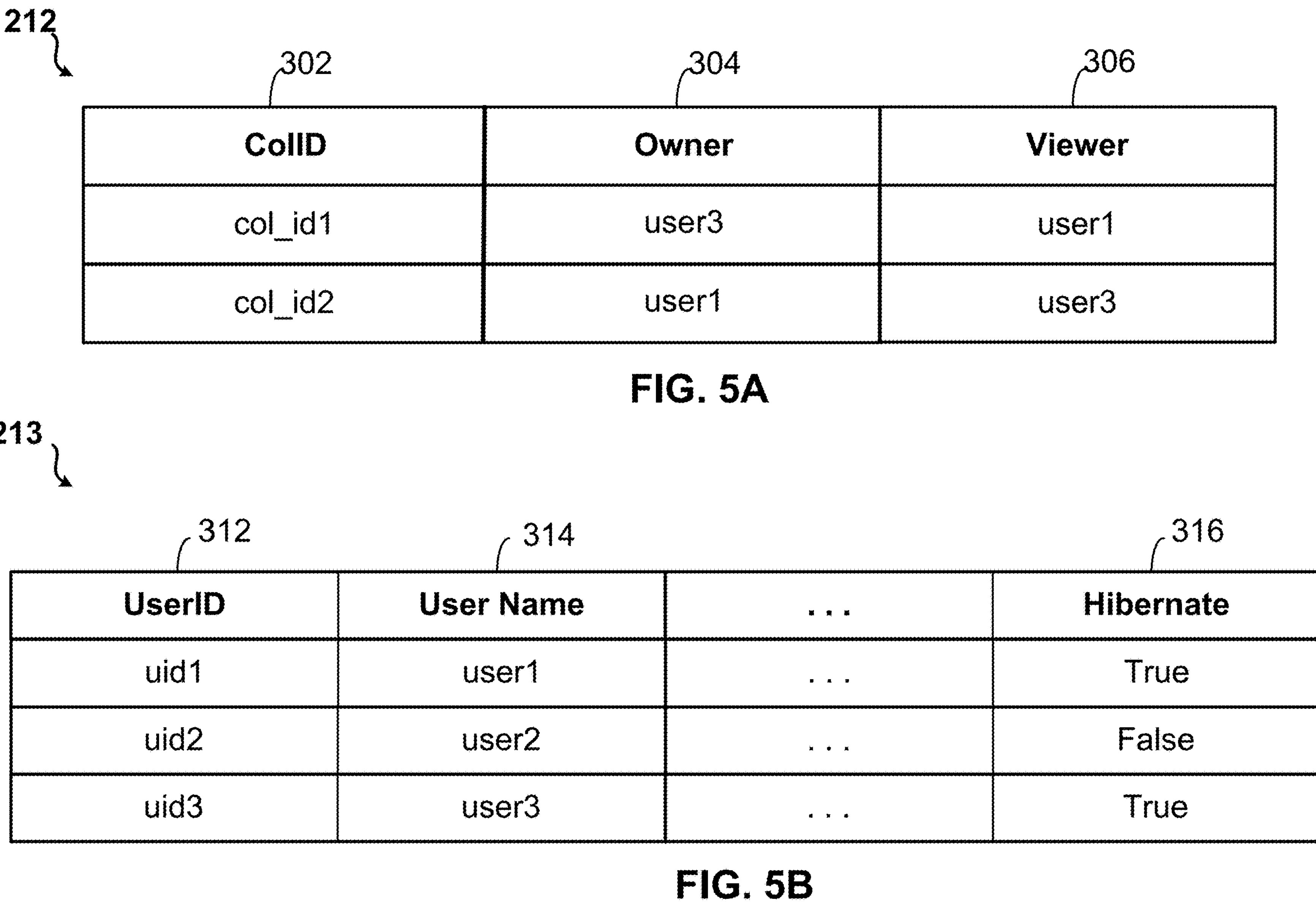
FIG. 5A shows an example secret column catalog table in accordance with the present disclosure.
FIG. 5B shows an example database user catalog table in accordance with the present disclosure.

The DBMS 108 can receive a second instruction to transfer ownership of the second fine-grained privacy-preserving column from user 2 to user 1. The DBMS 108 can receive the second instruction from the owner of the first fine-grained privacy-preserving column (e.g., user 2). The DBMS 108 can execute the second instruction. As shown in FIG. 5A, to execute the second instruction, the DBMS 108 can automatically update the secret column catalog table 212 in response to receiving the second instruction. For example, the secret column catalog table 212 can be updated to indicate that user 1 is now the sole owner of the second fine-grained privacy-preserving column.

Further, as shown in FIG. 5B, the DBMS 108 can automatically update the database user catalog table 213 in response to receiving the second instruction and/or in response to updating the secret column catalog table 212 to indicate that user 1 is now the sole owner of the second fine-grained privacy-preserving column. Because user 1 was already the viewer of the first fine-grained privacy-preserving column, the value of the variable corresponding to user 1 can already be set to the second value (e.g., true). Thus, the DBMS 108 can maintain the value of the variable corresponding to user 1 as the second value. The DBMS 108 can determine that the transfer of ownership of the second fine-grained privacy-preserving column from user 2 to user 1 has caused user 2 to no longer be the owner or viewer of any of the fine-grained privacy-preserving columns. Because user 2 is no longer the owner or the viewer of any of the fine-grained privacy-preserving columns, the variable in the control column in the row corresponding to user 2 can be automatically reverted back first value (e.g., false). Switching the value of the variable corresponding to user 2 back to the first value (e.g., false) resumes the authority of highly privilege users to reset the password of user 2.

FIG. 6 illustrates an example process 600 for implementing password resetting control in a database containing secret information. Although depicted as a sequence of operations in FIG. 6, those of ordinary skill in the art will appreciate that various embodiments may add, remove, reorder, or modify the depicted operations.

At 602, a control column (e.g., column 316) can be created in a database user catalog table (e.g., database user catalog table 213). The control column can include a variable configured to restrict an authority of a privileged user to reset passwords for owners or viewers of fine-grained privacy-preserving columns in a database. The fine-grained privacy-preserving columns can contain secret information. The variable can be binary variable, where a default setting of the variable has a first value.

At 604, a first instruction can be received. The first instruction can include an instruction to grant a first user as an owner or a viewer of a first fine-grained privacy-preserving column among the fine-grained privacy-preserving columns. The first fine-grained privacy-preserving column can be any one of the fine-grained privacy-preserving columns. At 606, a value of the variable corresponding to the first user can be automatically switched from the first value to a second value. The value of the variable corresponding to the first user can be automatically switched from the first value to the second value in response to determining that the first user is granted as the owner or the viewer of any one of the fine-grained privacy-preserving columns for a first time. The first value of the variable indicates that the privileged user has the authority to reset a password for the first user. The second value of the variable can indicate that the privileged user lacks the authority to reset the password for the first user.

FIG. 7 illustrates an example process 700 for implementing password resetting control in a database containing secret information. Although depicted as a sequence of operations in FIG. 7, those of ordinary skill in the art will appreciate that various embodiments may add, remove, reorder, or modify the depicted operations.

At 702, a control column (e.g., column 316) can be created in a database user catalog table (e.g., database user catalog table 213). The control column can include a variable configured to restrict an authority of a privileged user to reset passwords for owners or viewers of fine-grained privacy-preserving columns in a database. The fine-grained privacy-preserving columns can contain secret information. The variable can be binary variable, where a default setting of the variable has a first value.

At 704, a first instruction can be received. The first instruction can include an instruction to grant a first user as an owner or a viewer of a first fine-grained privacy-preserving column among the fine-grained privacy-preserving columns. The first fine-grained privacy-preserving column can be any one of the fine-grained privacy-preserving columns. At 706, a value of the variable corresponding to the first user can be automatically switched from the first value to a second value. The value of the variable corresponding to the first user can be automatically switched from the first value to the second value in response to determining that the first user is granted as the owner or the viewer of any one of the fine-grained privacy-preserving columns for a first time. The second value of the variable can indicate that the privileged user lacks the authority to reset a password for the first user.

At 708, a request can be received to reset the password of the first user. The request can be received from a highly privileged user. The DBMS will not reset the password of the first user based on determining that the value of the variable corresponding to the first user has the second value. Instead, at 710, an error message can be returned to the highly privileged user in response to the request based on determining that the value of the variable corresponding to the first user has the second value.

Figure 8:
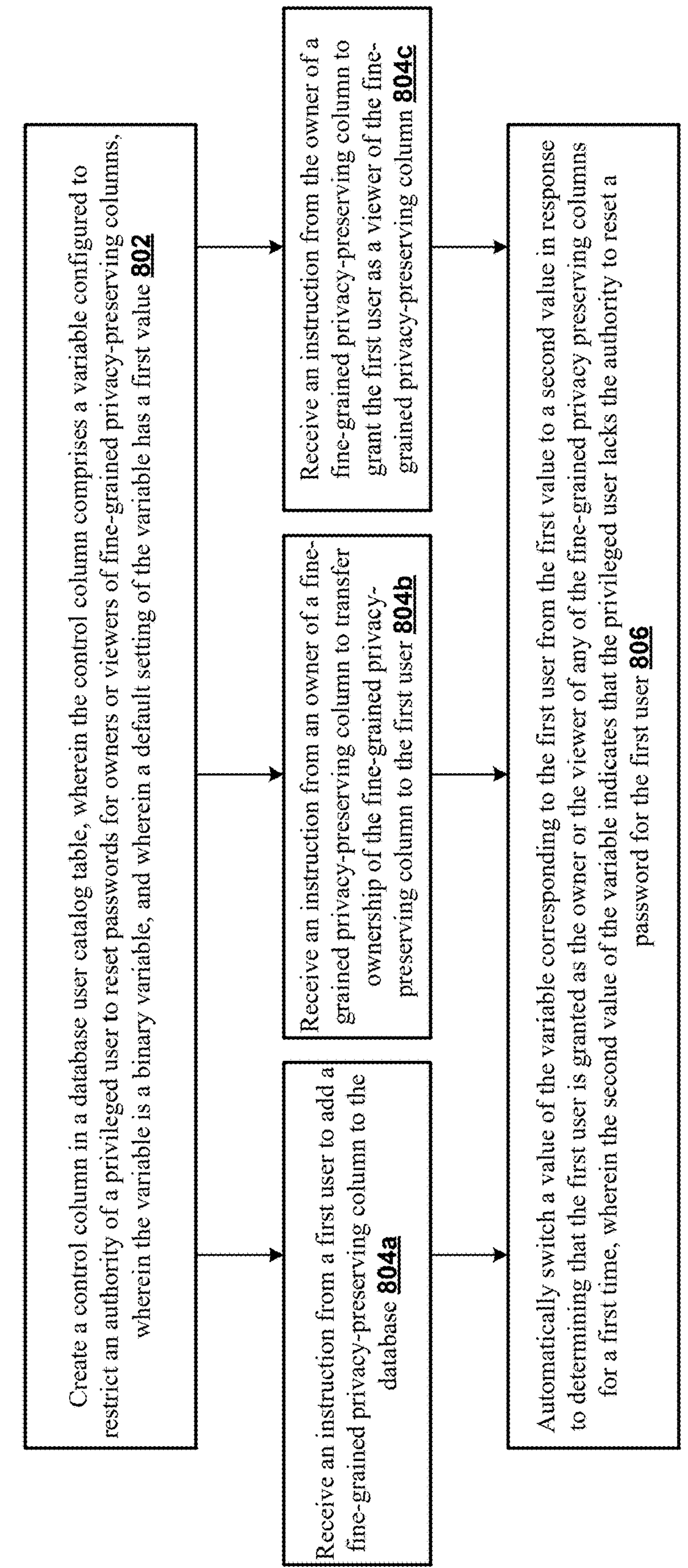
FIG. 8 shows an example process for implementing password resetting control in a database containing secret information in accordance with the present disclosure.

FIG. 8 illustrates an example process 800 for implementing password resetting control in a database containing secret information. Although depicted as a sequence of operations in FIG. 8, those of ordinary skill in the art will appreciate that various embodiments may add, remove, reorder, or modify the depicted operations.

At 802, a control column (e.g., column 316) can be created in a database user catalog table (e.g., database user catalog table 213). The control column can include a variable configured to restrict an authority of a privileged user to reset passwords for owners or viewers of fine-grained privacy-preserving columns in a database. The fine-grained privacy-preserving columns can contain secret information. The variable can be binary variable, where a default setting of the variable has a first value.

A first instruction can be received. The first instruction can include an instruction to grant a first user as an owner or a viewer of a first fine-grained privacy-preserving column among the fine-grained privacy-preserving columns. The first fine-grained privacy-preserving column can be any one of the fine-grained privacy-preserving columns. At 804*a*, an instruction can be received from the first user to add the first fine-grained privacy-preserving column to the database (e.g., an instruction to create the first fine-grained privacy-preserving column). At 804*b*, an instruction can be received from an owner of the first fine-grained privacy-preserving column to transfer an ownership of the first fine-grained privacy-preserving column to the first user. At 804*c*, an instruction can be received from the owner of the first fine-grained privacy-preserving column to grant the first user as a viewer of the first fine-grained privacy-preserving column.

At 806, a value of the variable corresponding to the first user can be automatically switched from the first value to a second value. The value of the variable corresponding to the first user can be automatically switched from the first value to the second value in response to determining that the first user is granted as the owner or the viewer of any one of the fine-grained privacy-preserving columns for a first time. The second value of the variable can indicate that the privileged user lacks the authority to reset a password for the first user.

Figure 9:
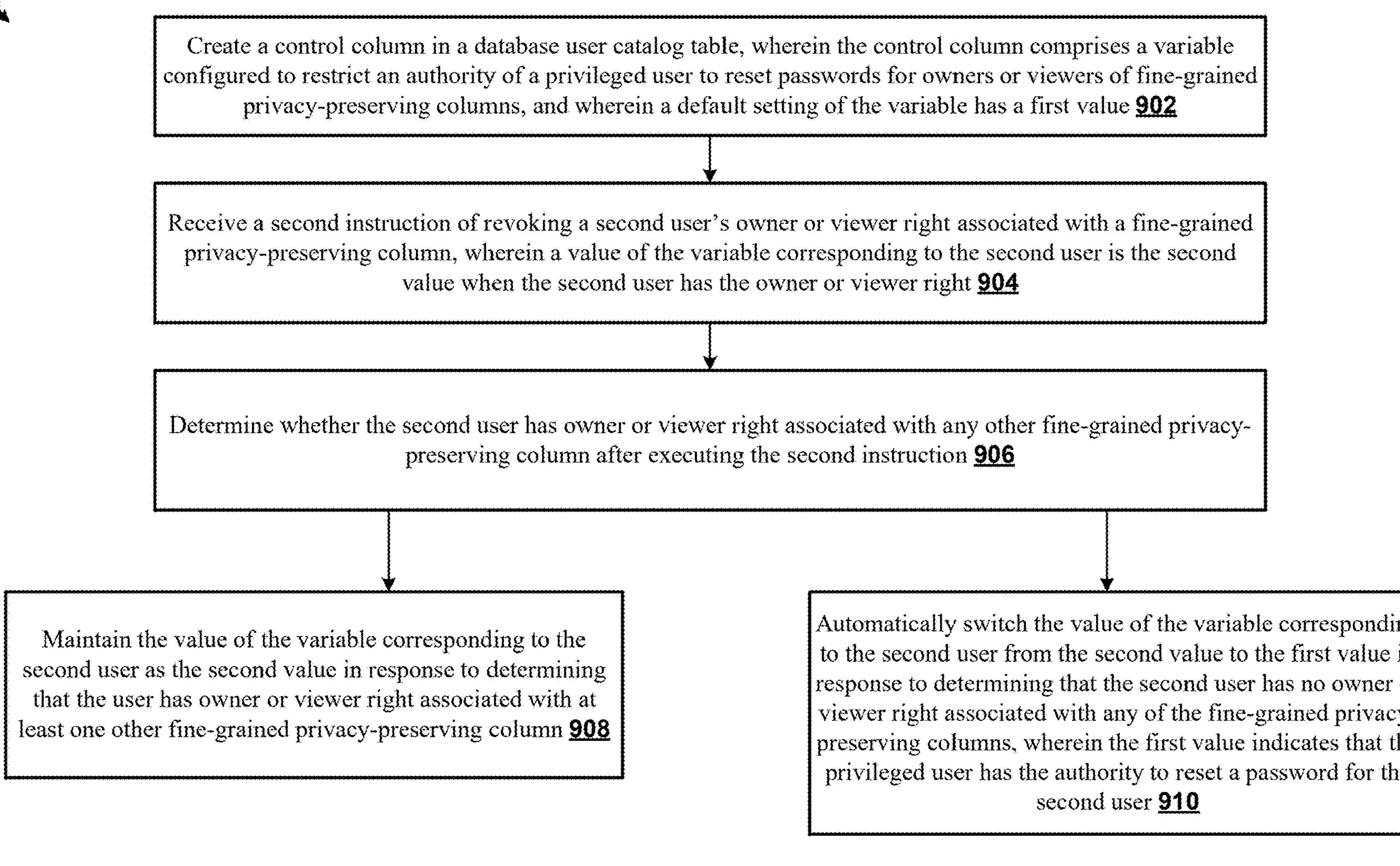
FIG. 9 shows an example process for implementing password resetting control in a database containing secret information in accordance with the present disclosure.

FIG. 9 illustrates an example process 900 for implementing password resetting control in a database containing secret information. Although depicted as a sequence of operations in FIG. 9, those of ordinary skill in the art will appreciate that various embodiments may add, remove, reorder, or modify the depicted operations.

At 902, a control column (e.g., column 316) can be created in a database user catalog table (e.g., database user catalog table 213). The control column can include a variable configured to restrict an authority of a privileged user to reset passwords for owners or viewers of fine-grained privacy-preserving columns in a database. The fine-grained privacy-preserving columns can contain secret information. The variable can be binary variable, where a default setting of the variable has a first value.

At 904, a second instruction can be received. The second instruction can include an instruction to revoke a second user's owner or viewer right associated with a fine-grained privacy-preserving column among the fine-grained privacy-preserving columns. The second fine-grained privacy-preserving column can be any one of the fine-grained privacy-preserving columns. The second instruction can be executed. To execute the second instruction, a secret column catalog table can be updated to indicate that the second user is no longer the owner or the viewer of the fine-grained privacy-preserving column. At 906, it can be determined whether the second user has owner or viewer right associated with any other fine-grained privacy-preserving column after executing the second instruction.

If it is determined that the second user has owner or viewer right associated with at least one other fine-grained privacy-preserving column, the method 900 can proceed to 908. At 908, the value of the variable in the database user catalog table corresponding to the second user can be maintained as the second value. The value of the variable in the database user catalog table corresponding to the second user can be maintained as the second value in response to determining that the user has owner or viewer right associated with at least one other fine-grained privacy-preserving column.

Conversely, if it is determined that the second user does not have owner or viewer rights associated with any other fine-grained privacy-preserving column, the method 900 can proceed to 910. At 910, the value of the variable corresponding to the second user can be automatically switched from the second value to the first value. The value of the variable corresponding to the second user can be automatically switched from the second value to the first value in response to determining that the second user has no owner or viewer right associated with any of the fine-grained privacy-preserving columns. The first value indicates that the privileged user has the authority to reset a password for the second user.

Figure 10:
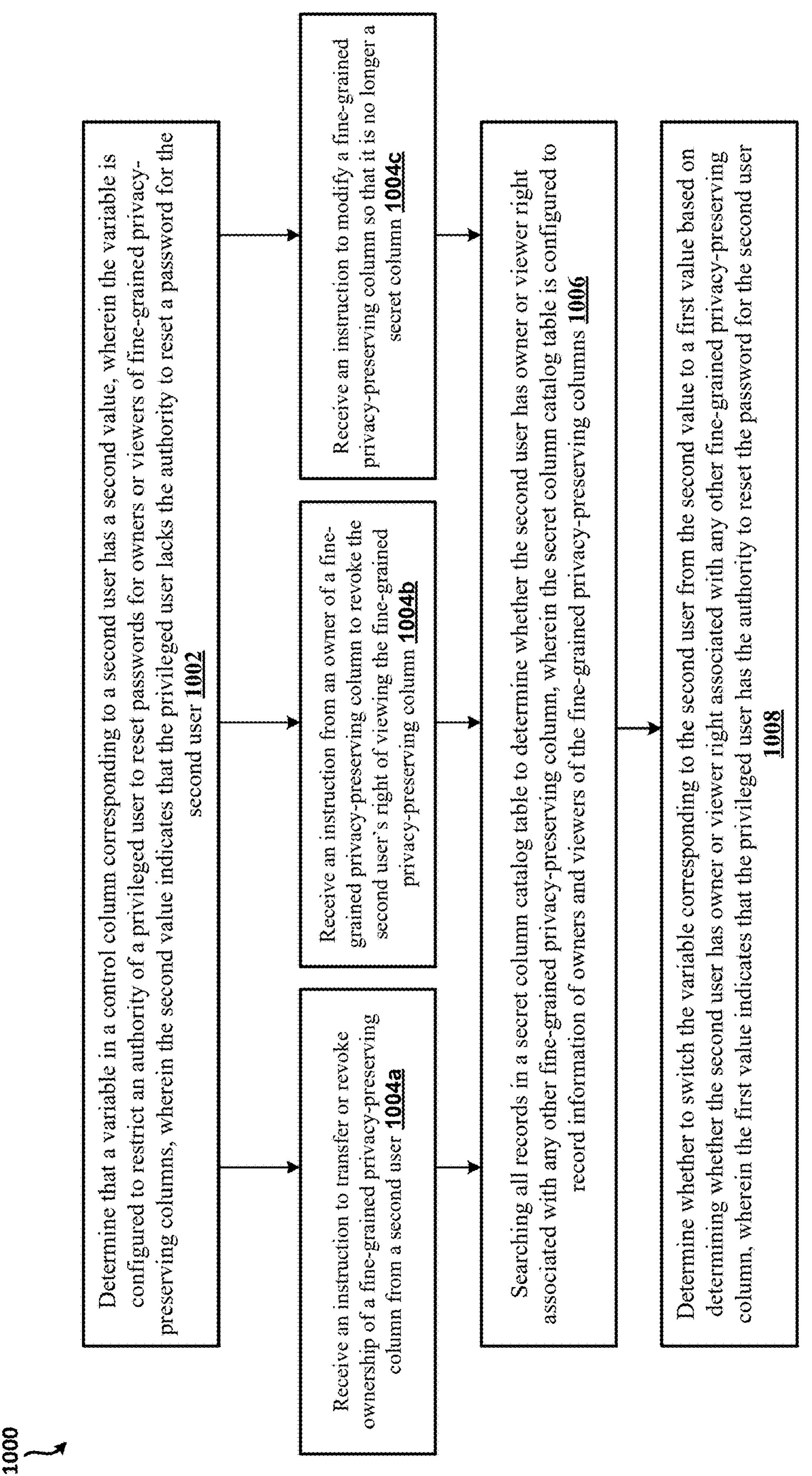
FIG. 10 shows an example process for implementing password resetting control in a database containing secret information in accordance with the present disclosure.

FIG. 10 illustrates an example process 1000 for implementing password resetting control in a database containing secret information. Although depicted as a sequence of operations in FIG. 10, those of ordinary skill in the art will appreciate that various embodiments may add, remove, reorder, or modify the depicted operations.

At 1002, it can be determined that a variable in a control column corresponding to a second user has a second value. The variable can be configured to restrict an authority of a privileged user to reset passwords for owners or viewers of fine-grained privacy-preserving columns. The second value can indicate that the privileged user lacks the authority to reset a password for the second user.

A second instruction can be received. The second instruction can include an instruction to revoke a second user's owner or viewer right associated with a fine-grained privacy-preserving column among the fine-grained privacy-preserving columns. The second fine-grained privacy-preserving column can be any one of the fine-grained privacy-preserving columns. At 1004*a*, an instruction to transfer or revoke ownership of the second fine-grained privacy-preserving column from the second user can be received. At 1004*b*, an instruction can be received from an owner of the second fine-grained privacy-preserving column to revoke the second user's right of viewing the second fine-grained privacy-preserving column. At 1004*c*, an instruction to modify the second fine-grained privacy-preserving column so that it is no longer a secret column can be received.

At 1006, it can be determined whether the second user has owner or viewer right associated with any other fine-grained privacy-preserving column after executing the second instruction. Determining whether the second user has owner or viewer right associated with any other fine-grained privacy-preserving column after executing the second instruction can include searching all records in a secret column catalog table. The secret column catalog table can be configured to record information of owners and viewers of the fine-grained privacy-preserving columns.

At 1008, it can be determined whether to switch the variable corresponding to the second user from the second value to a first value. It can be determined whether to switch the variable corresponding to the second user from the second value to a first value based on determining whether the second user has owner or viewer right associated with any other fine-grained privacy-preserving column. If it is determined that the second user has owner or viewer right associated with at least one other fine-grained privacy-preserving column, the value of the variable in the database user catalog table corresponding to the second user can be maintained as the second value. Conversely, if it is determined that the second user does not have owner or viewer rights associated with any other fine-grained privacy-preserving column, the value of the variable corresponding to the second user can be automatically switched from the second value to the first value. The first value indicates that the privileged user has the authority to reset a password for the second user.

FIG. 11 illustrates an example process 1100 for implementing password resetting control in a database containing secret information. Although depicted as a sequence of operations in FIG. 11, those of ordinary skill in the art will appreciate that various embodiments may add, remove, reorder, or modify the depicted operations.

At 1102, a control column (e.g., column 316) can be created in a database user catalog table (e.g., database user catalog table 213). The control column can include a variable configured to restrict an authority of a privileged user to reset passwords for owners or viewers of fine-grained privacy-preserving columns in a database. The fine-grained privacy-preserving columns can contain secret information. The variable can be binary variable, where a default setting of the variable has a first value. If a first user is neither the owner nor the viewer of any of the fine-grained privacy-preserving columns (e.g., as indicated by the secret column catalog table), the variable in the control column of the row corresponding to the first user can be set to the first value. At 1104, a request can be received to reset the password of a user. The request can be received from a highly privileged user. At 1106, the password of the user can be reset. The password of the user can be reset based on determining that the value of the variable corresponding to the user has the first value.

Figure 12:
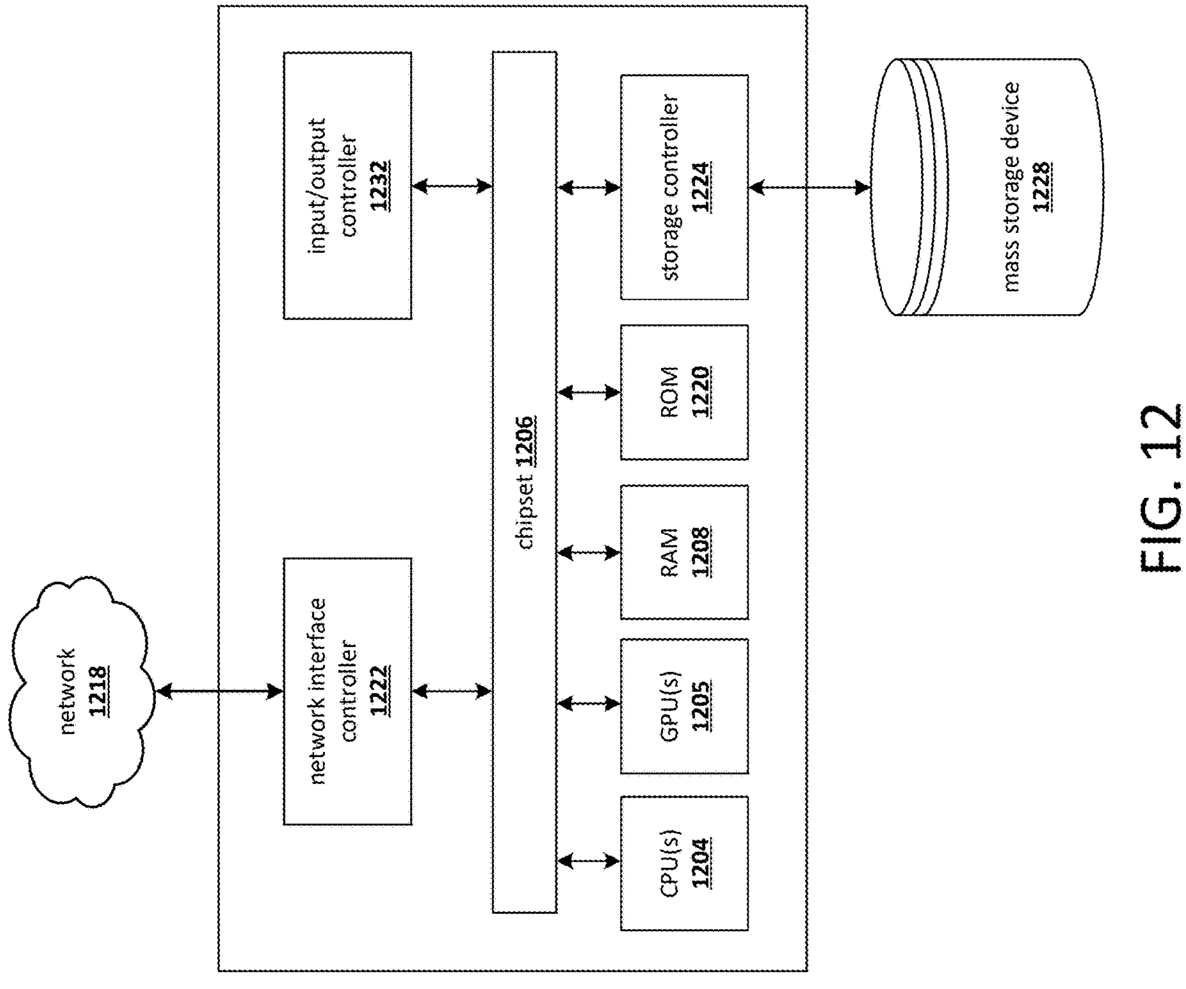
FIG. 12 shows an example computing device which may be used to perform any of the techniques disclosed herein.

FIG. 12 illustrates a computing device that may be used in various aspects, such as the model(s), components, and/or devices depicted in FIGS. 1 and 2. With regard to FIGS. 1 and 2, any or all of the components may each be implemented by one or more instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s) 1205. The GPU(s) 1205 may comprise processing units specialized for but not necessarily limited to highly parallel computations, such as graphics and other visualization-related processing.

A chipset 1206 may provide an interface between the CPU(s) 1204 and the remainder of the components and devices on the baseboard. The chipset 1206 may provide an interface to a random-access memory (RAM) 1208 used as the main memory in the computing device 1200. The chipset 1206 may further provide an interface to a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1216. It should be appreciated that multiple NICs 1222 may be present in the computing device 1200, connecting the computing device to other types of networks and remote computer systems.

The computing device 1200 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1200 through a storage controller 1224 connected to the chipset 1206. The mass storage device 1228 may consist of one or more physical storage units. The mass storage device 1228 may comprise a management component 1210. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1200 may store information to the mass storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may further read information from the mass storage device 1228 by detecting the physical states or characteristics of one or more particular locations within the physical storage units.

In addition to the mass storage device 1228 described above, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1200.

The mass storage device 1228 or other computer-readable storage media may also be encoded with computer-executable instructions, which, when loaded into the computing device 1200, transforms the computing device from a general-purpose computing system into a special-purpose computer capable of implementing the aspects described herein. These computer-executable instructions transform the computing device 1200 by specifying how the CPU(s) 1204 transition between states, as described above. The computing device 1200 may have access to computer-readable storage media storing computer-executable instructions, which, when executed by the computing device 1200, may perform the methods described herein.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of implementing password resetting control in a database containing secret information, comprising:

creating a control column in a database user catalog table, wherein the control column comprises a variable configured to restrict an authority of a privileged user to reset passwords for owners or viewers of privacy-preserving columns, wherein the privacy-preserving columns contain the secret information, wherein the variable is a binary variable, and wherein a default setting of the variable has a first value;

receiving a first instruction of granting a first user as an owner or a viewer of a first privacy-preserving column, wherein the first privacy-preserving column is any of the privacy-preserving columns; and automatically switching a value of the variable corresponding to the first user from the first value to a second value in response to determining that the first user is granted as the owner or the viewer for a first time, wherein the first value of the variable indicates that the privileged user has the authority to reset a password for the first user, and wherein the second value of the variable indicates that the privileged user lacks the authority to reset the password for the first user.

2. The method of claim 1, further comprising:

receiving a request from the privileged user to reset the password of the first user; and returning an error message in response to the request based on determining that the value of the variable corresponding to the first user has the second value.

3. The method of claim 1, wherein the first instruction of granting the first user as the owner or the viewer of the first privacy-preserving column comprises at least one of:

an instruction from the first user to add the first privacy-preserving column to the database;

an instruction from an owner of the first privacy-preserving column to transfer an ownership of the first privacy-preserving column to the first user; or an instruction from the owner of the first privacy-preserving column to grant the first user as a viewer of the first privacy-preserving column.

4. The method of claim 1, further comprising:

receiving a second instruction of revoking a second user's owner or viewer right associated with a second privacy-preserving column, wherein a value of the variable corresponding to the second user is the second value when the second user has the owner or viewer right; and determining whether the second user has owner or viewer right associated with any other privacy-preserving column after executing the second instruction.

5. The method of claim 4, further comprising:

determining whether the second user has owner or viewer right associated with any other privacy-preserving column by searching all records in a secret column catalog table, wherein the secret column catalog table is configured to record information of owners and viewers of the privacy-preserving columns.

6. The method of claim 4, further comprising:

maintaining the value of the variable corresponding to the second user as the second value in response to determining that the user has owner or viewer right associated with at least one other privacy-preserving column.

7. The method of claim 4, further comprising:

automatically switching the value of the variable corresponding to the second user from the second value to the first value in response to determining that the second user has no owner or viewer right associated with any of the privacy-preserving columns, wherein the first value indicates that the privileged user has the authority to reset a password for the second user.

8. The method of claim 7, further comprising:

receiving a request from the privileged user to reset the password of the second user; and resetting the password of the second user in response to the request based on determining that the value of the variable corresponding to the second user has the first value.

9. The method of claim 4, wherein the second instruction of revoking the second user's owner or viewer right associated with the second privacy-preserving column comprises at least one of:

an instruction to transfer or revoke ownership of the second privacy-preserving column from the second user;

an instruction from an owner of the second privacy-preserving column to revoke the second user's right of viewing the second privacy-preserving column; or an instruction to modify the second privacy-preserving column so that it is no longer a secret column.

10. The method of claim 1, wherein the privileged user comprises a database administrator (DBA).

11. A system of implementing password resetting control in a database containing secret information, comprising:

at least one processor; and at least one memory communicatively coupled to the at least one processor and comprising computer-readable instructions that upon execution by the at least one processor cause the at least one processor to perform operations comprising:

creating a control column in a database user catalog table, wherein the control column comprises a variable configured to restrict an authority of a privileged user to reset passwords for owners or viewers of privacy-preserving columns, wherein the privacy-preserving columns contain the secret information, wherein the variable is a binary variable, and wherein a default setting of the variable has a first value;

receiving a first instruction of granting a first user as an owner or a viewer of a first privacy-preserving column, wherein the first privacy-preserving column is any of the privacy-preserving columns; and automatically switching a value of the variable corresponding to the first user from the first value to a second value in response to determining that the first user is granted as the owner or the viewer for a first time, wherein the first value of the variable indicates that the privileged user has the authority to reset a password for the first user, and wherein the second value of the variable indicates that the privileged user lacks the authority to reset the password for the first user.

12. The system of claim 11, the operations further comprising:

receiving a request from the privileged user to reset the password of the first user; and returning an error message in response to the request based on determining that the value of the variable corresponding to the first user has the second value.

13. The system of claim 11, the operations further comprising:

receiving a second instruction of revoking a second user's owner or viewer right associated with a second privacy-preserving column, wherein a value of the variable corresponding to the second user is the second value when the second user has the owner or viewer right; and determining whether the second user has owner or viewer right associated with any other privacy-preserving column after executing the second instruction.

14. The system of claim 13, the operations further comprising:

maintaining the value of the variable corresponding to the second user as the second value in response to determining that the user has owner or viewer right associated with at least one other privacy-preserving column.

15. The system of claim 13, the operations further comprising:

automatically switching the value of the variable corresponding to the second user from the second value to the first value in response to determining that the second user has no owner or viewer right associated with any of the privacy-preserving columns, wherein the first value indicates that the privileged user has the authority to reset a password for the second user.

16. A non-transitory computer-readable storage medium, storing computer-readable instructions that upon execution by a processor cause the processor to implement operations comprising:

creating a control column in a database user catalog table, wherein the control column comprises a variable configured to restrict an authority of a privileged user to reset passwords for owners or viewers of privacy-preserving columns, wherein the privacy-preserving columns contain the secret information, wherein the variable is a binary variable, and wherein a default setting of the variable has a first value;

receiving a first instruction of granting a first user as an owner or a viewer of a first privacy-preserving column, wherein the first privacy-preserving column is any of the privacy-preserving columns; and automatically switching a value of the variable corresponding to the first user from the first value to a second value in response to determining that the first user is granted as the owner or the viewer for a first time, wherein the first value of the variable indicates that the privileged user has the authority to reset a password for the first user, and wherein the second value of the variable indicates that the privileged user lacks the authority to reset the password for the first user.

17. The non-transitory computer-readable storage medium of claim 16, the operations further comprising:

receiving a request from the privileged user to reset the password of the first user; and returning an error message in response to the request based on determining that the value of the variable corresponding to the first user has the second value.

18. The non-transitory computer-readable storage medium of claim 16, the operations further comprising:

receiving a second instruction of revoking a second user's owner or viewer right associated with a second privacy-preserving column, wherein a value of the variable corresponding to the second user is the second value when the second user has the owner or viewer right; and determining whether the second user has owner or viewer right associated with any other privacy-preserving column after executing the second instruction.

19. The non-transitory computer-readable storage medium of claim 18, the operations further comprising:

maintaining the value of the variable corresponding to the second user as the second value in response to determining that the user has owner or viewer right associated with at least one other privacy-preserving column.

20. The non-transitory computer-readable storage medium of claim 18, the operations further comprising:

automatically switching the value of the variable corresponding to the second user from the second value to the first value in response to determining that the second user has no owner or viewer right associated with any of the privacy-preserving columns, wherein the first value indicates that the privileged user has the authority to reset a password for the second user.

* * * * *